(12) United States Patent  
Takakura et al.

(10) Patent No.: US 7,764,835 B2
(45) Date of Patent: Jul. 27, 2010

(54) METHOD AND APPARATUS FOR RECOGNIZING CODE

(75) Inventors: Hiroyuki Takakura, Kawasaki (JP); Hirotaka Chiba, Kawasaki (JP); Nobuyasu Yamaguchi, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1001 days.

(21) Appl. No.: 11/119,782

(22) Filed: May 3, 2005

(65) Prior Publication Data

US 2005/0194445 A1 Sep. 8, 2005

Related U.S. Application Data

(63) Continuation of application No. PCT/JP03/04783, filed on Apr. 15, 2003.

(51) Int. Cl.
*G06K 9/00* (2006.01)
(52) U.S. Cl. .................. 382/168; 382/312; 382/313
(58) Field of Classification Search .......... 382/181, 382/196, 197, 199, 118, 313, 312, 168; 348/207.1, 348/231.3, 333.02; 235/462.25, 462.09, 235/462.24, 3.1, 462.1
See application file for complete search history.

(56) References Cited

U.S. PATENT DOCUMENTS

| | | | |
|---|---|---|---|
| 5,020,119 A | 5/1991 | Tai et al. ................ 382/269 |
| 5,111,194 A | 5/1992 | Oneda ..................... 345/690 |
| 5,567,934 A | 10/1996 | Zheng et al. ............. 250/237 R |
| 5,726,435 A | 3/1998 | Hara et al. ................ 235/494 |
| 5,811,779 A | 9/1998 | Gaylord, Jr. et al. ... 235/462.01 |
| 6,000,614 A | 12/1999 | Yang et al. ................ 235/460 |
| 6,015,089 A | 1/2000 | Hecht et al. ............. 235/462.16 |
| 6,081,627 A * | 6/2000 | Kannon et al. ............. 382/312 |
| 6,181,839 B1 * | 1/2001 | Kannon et al. ............. 382/312 |
| 6,786,412 B2 * | 9/2004 | Shimizu ................ 235/462.25 |
| 6,983,886 B2 * | 1/2006 | Natsukari et al. ........ 235/462.1 |

(Continued)

FOREIGN PATENT DOCUMENTS

JP 61-103372 5/1986

(Continued)

OTHER PUBLICATIONS

Korean Office Action, mailed on Aug. 30, 2006, in a corresponding Korean Patent Application.

(Continued)

*Primary Examiner*—Anh Hong Do
(74) *Attorney, Agent, or Firm*—Staas & Halsey LLP

(57) ABSTRACT

When it is determined whether the color of each cell of an image is black or white from the gradation value of each cell, the determination is made by comparison of the gradation level of the cell with a threshold if the gradation level is sufficiently close to that of black or white. In contrast, if the gradation value of the cell is within a gray zone, the color of the cell is determined from the colors of the cells adjacent to the cell of interest. That is, if the gradation value of the cell is gray and the colors of the adjacent cells are all black, the color of the cell is determined to be white; and conversely if the colors of all the adjacent cells are white, the color of the cell is determined to be black.

18 Claims, 18 Drawing Sheets

U.S. PATENT DOCUMENTS

| | | |
|---|---|---|
| 7,092,010 B2 * | 8/2006 | Iida .......................... 348/207.1 |
| 7,120,278 B2 * | 10/2006 | Sukegawa et al. ........... 382/118 |
| 2001/0022851 A1 | 9/2001 | Nagai et al. ................. 382/162 |
| 2002/0021839 A1 | 2/2002 | Takahashi ................... 382/225 |
| 2002/0051573 A1 | 5/2002 | Sakai et al. ............ 235/462.09 |
| 2002/0149693 A1 | 10/2002 | Tantalo et al. ............... 248/362 |

FOREIGN PATENT DOCUMENTS

| | | |
|---|---|---|
| JP | 2-253484 | 10/1990 |
| JP | 3-36881 | 2/1991 |
| JP | 3-128574 | 5/1991 |
| JP | 7-254037 | 10/1995 |
| JP | 8-139916 | 5/1996 |
| JP | 10-91717 | 4/1998 |
| JP | 10-187868 | 7/1998 |
| JP | 2001-245139 | 9/2001 |
| JP | 2001-251507 | 9/2001 |
| JP | 2001-312721 | 11/2001 |

OTHER PUBLICATIONS

Supplementary European Search Report issued in corresponding European Patent Application No. 03717594.0, Sep. 18, 2007.

Offical Communication issued in corresponding European Patent Application No. 03717594.0, on Nov. 26, 2007.

Office Action mailed on Nov. 4, 2008 and issued in corresponding Japanese Patent Application No. 2004-570880.

* cited by examiner

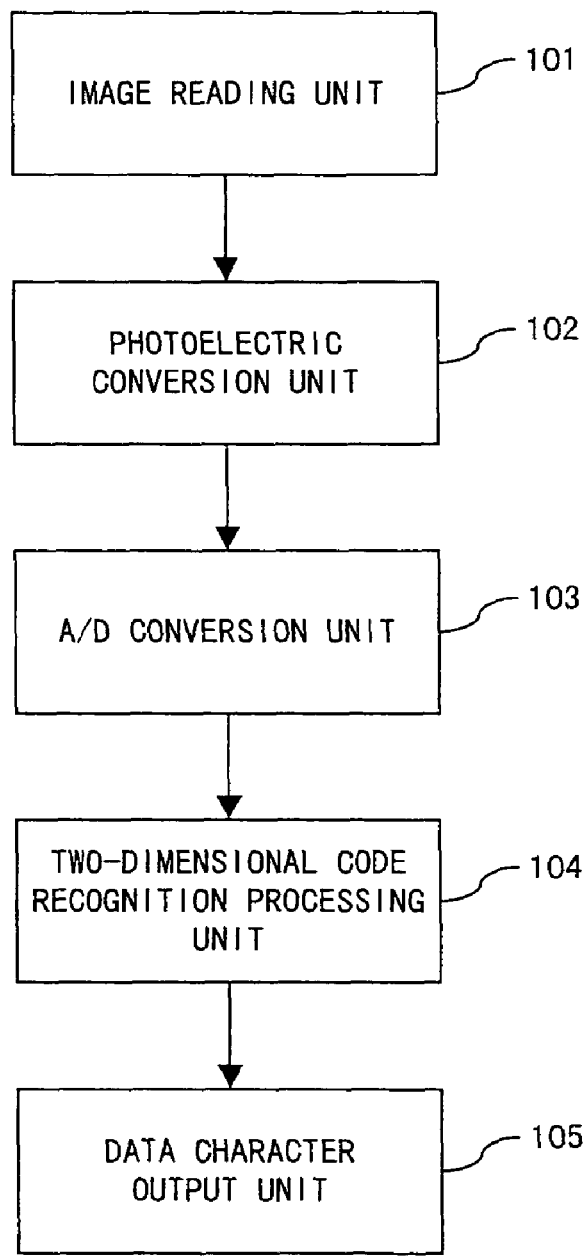
F I G. 1

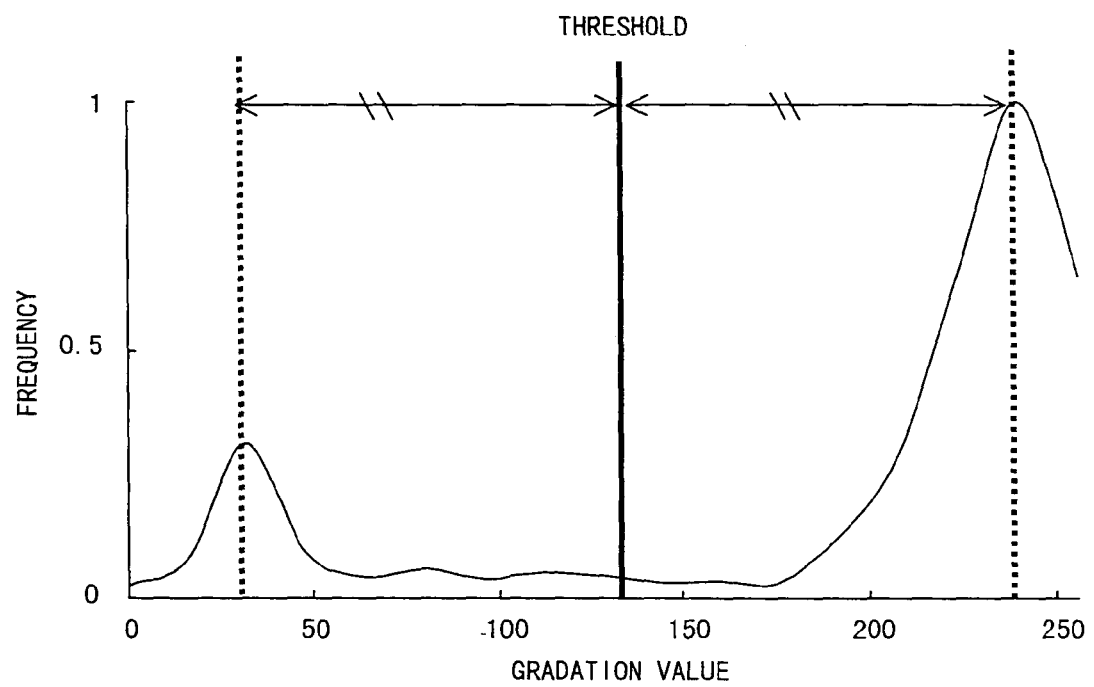
F I G. 2

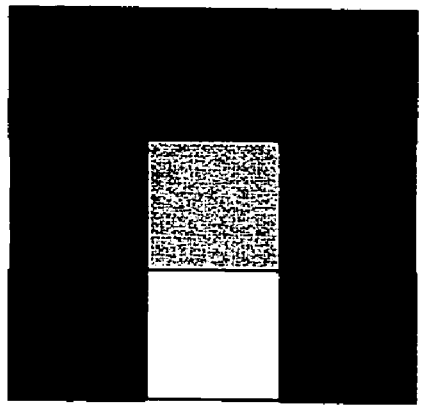
THRESHOLD < 156 ⇒ WHITE
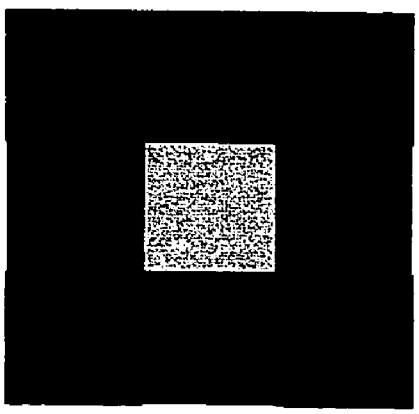
FIG. 4

FOUR ADJACENT CELLS
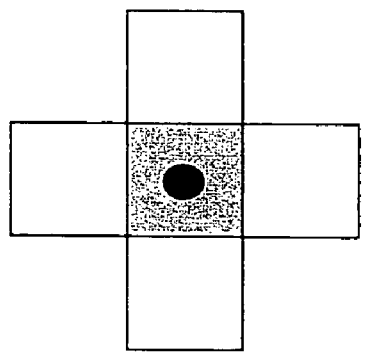
EIGHT ADJACENT CELLS
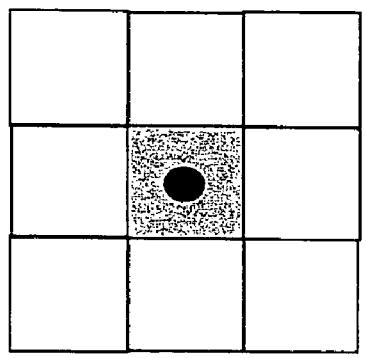
FIG. 5

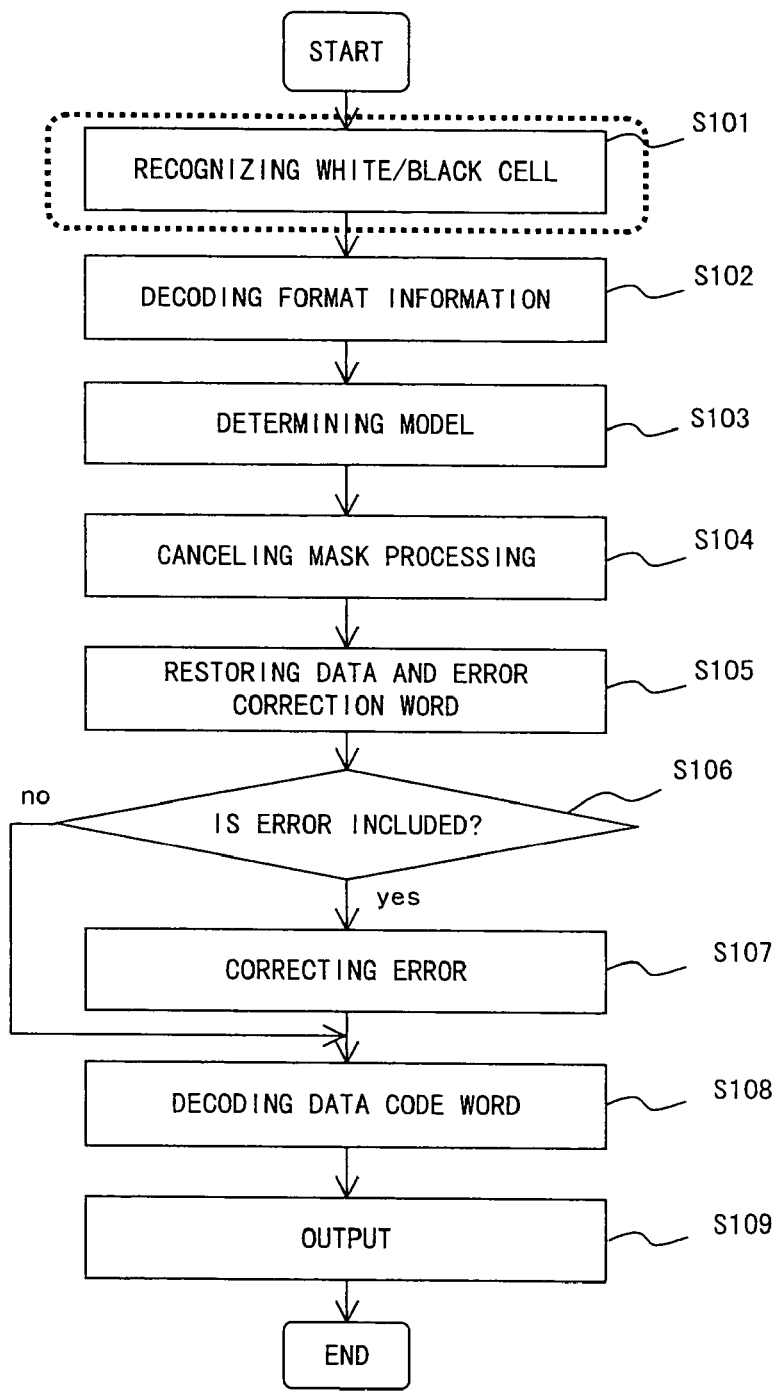
F I G. 7

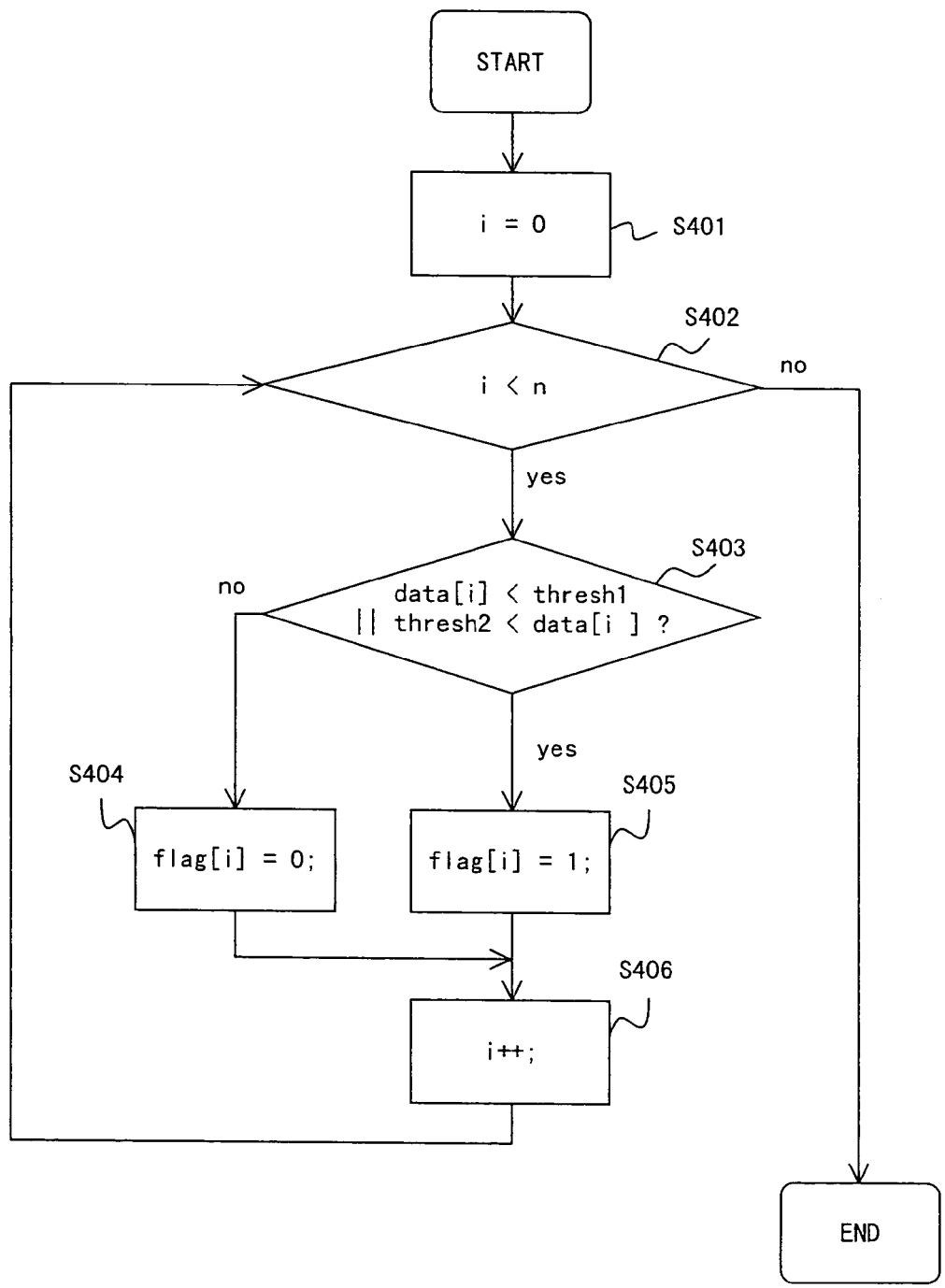
F I G. 10

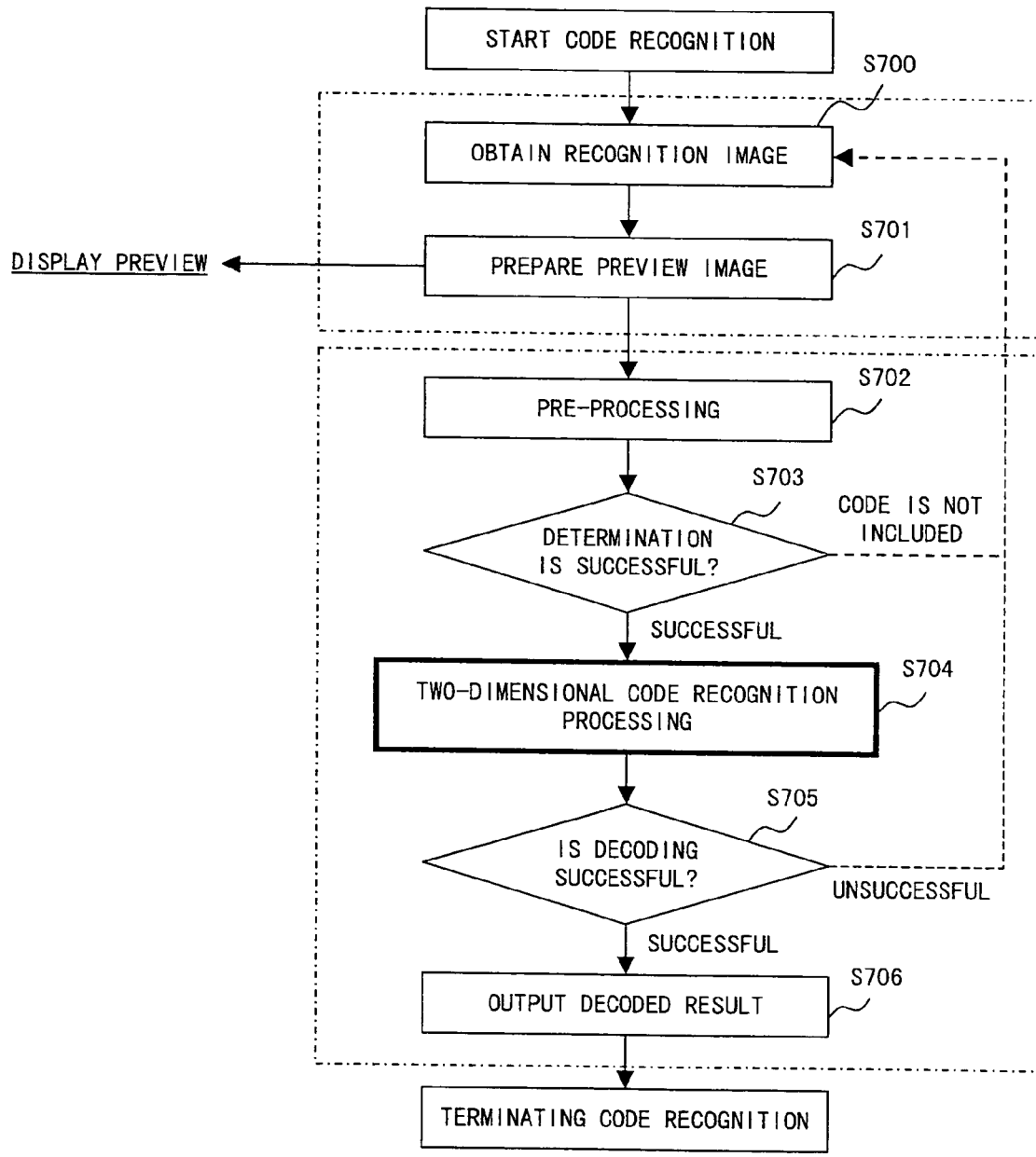
F I G. 1 3

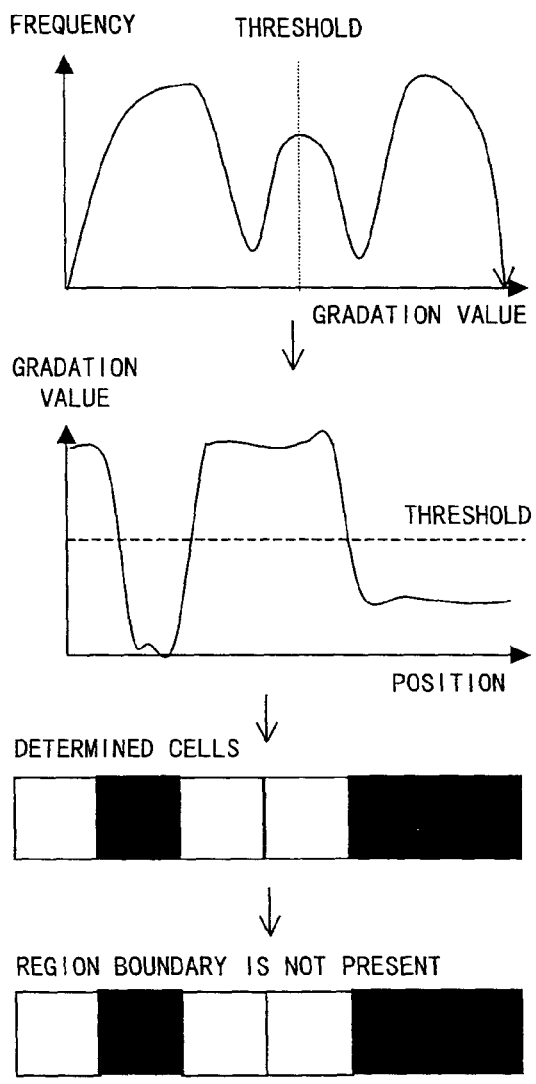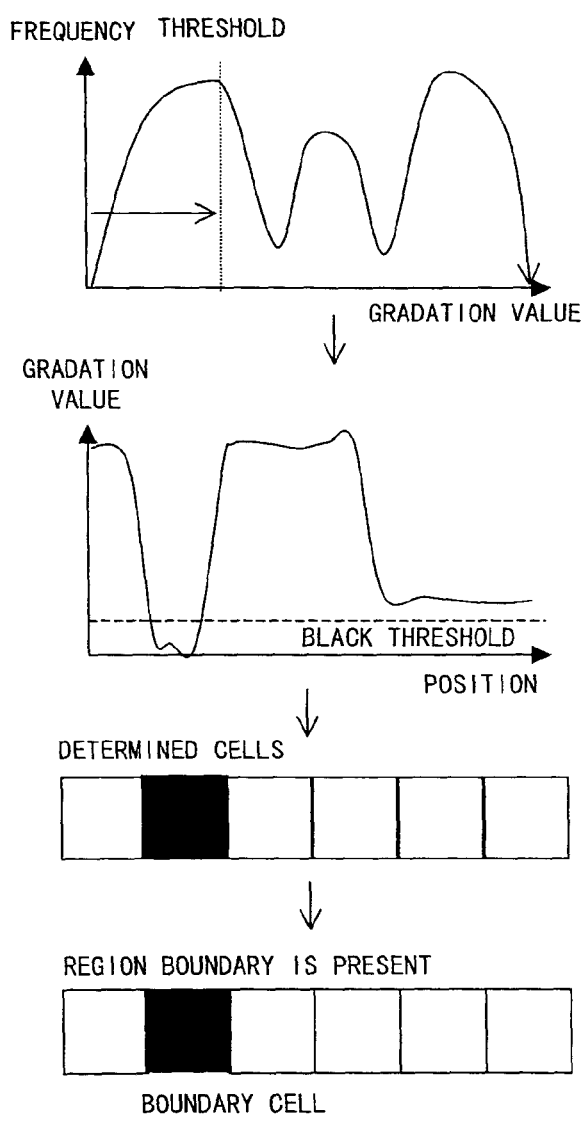
FIG. 18

METHOD AND APPARATUS FOR RECOGNIZING CODE

CROSS REFERENCE TO RELATED APPLICATION

This application is a continuation of international PCT application No. PCT/JP2003/004783 filed on Apr. 15, 2003.

BACKGROUND OF THE INVENTION

1. Field of the Invention

The present invention relates to a method and an apparatus for reading and recognizing a two-dimensional code image that is input from an optical reading apparatus such as a scanner, a CCD camera, etc.

2. Description of the Related Art

In a conventional two-dimensional code reading apparatus, the two-dimensional code image that is input by an optical reading apparatus is binarized and recognition processing is performed on the binarized image (refer to FIG. 14 of patent literature 1 or FIG. 1 of patent literature 2). There is a problem such that recognition accuracy is decreased due to the influence of data distortion occurring in the case where the reading apparatus does not have a resolution higher than a predetermined value, when recognition processing is performed after the image data read by an optical apparatus is converted into binary data. For example, an isolated cell (in a two-dimensional code, a square comprising a black dot or a white dot is called a cell) surrounded by cells of different types in four or eight directions thereof is influenced by the adjacent cells in the case where the optical resolution of the reading apparatus is low or the image formed within the apparatus is out of focus and accordingly the cell is converted into an erroneous value. Such a problem becomes prominent in the case where a two-dimensional code is read using the built-in compact camera of a portable terminal as the amount of light gathered is small, since the optical apparatus is also small.

Even when recognition processing is performed without using binarization processing, the above-mentioned problem cannot be solved if a simple binarization method is used to determine cell values. Additionally, in the case where the image of a two-dimensional code to be recognized is photographed by a moving recognition apparatus with a camera, the time required for recognition processing is generally greater than the available exposure time of each image. Consequently, the functionality of the user interface is reduced as the number of images to be displayed for each unit of time decreases. In such a case, an image is photographed using the exposure control method of a still image. In order to virtually increase the sensors effective sensitivity, especially, under low light conditions, an image securing a broad gradation is obtained by performing multiple-exposure (long-shuttering) processing of an image over a plurality of frames while exceeding the reading time of the image data of one frame of the camera. This introduces the problem that an indistinct image is obtained of moving targets by performing multiple-exposure processing of the target over a plurality of frames and consequently the recognition performance is lowered.

[Patent Literature 1]

Specification of patent application No. 6-042587 (Japanese unexamined patent application publication No. 7-254037)

[Patent Literature 2]

Specification of patent application No. 8-341354 (Japanese unexamined patent application publication No. 10-187868)

An isolated cell that is surrounded by cells of different types (cells having different gradation values such as white, black, etc.) in four directions or eight directions thereof is influenced by the adjacent cells in respect of a gradation value thereof in the case where the optical resolution of the apparatus is low or the apparatus cannot maintain focus. Therefore, there arises a problem such that the value of the cell cannot be precisely converted using a simple binarizing method alone.

SUMMARY OF THE INVENTION

The object of the present invention is to offer a two-dimensional code reading method of precisely converting the value of a cell without decreasing the recognition accuracy even in the case where the optical resolution of the reading apparatus is low and focus cannot be maintained. Furthermore, another object of the present invention is to offer a recognition apparatus for enhancing the recognition performance by increasing the recognition processing speed for each unit of time, thereby increasing the number of images to be displayed and enhancing the functionality of a user interface and also by obtaining image data in a low light environment that can be recognized. In recognition processing of a two-dimensional code image that is obtained by generating cells from data to be arranged in two dimensions, these objects can be achieved by a two-dimensional recognition method comprising; a coordinate value detection step of detecting the coordinates of a cell in a two-dimensional matrix; a gradation value detection step of obtaining a gradation value of the detected coordinate; a histogram preparation step of preparing a histogram by obtaining the frequency of the gradation values of an image; a threshold detection step of obtaining a threshold from the histogram; a region range determination step of obtaining a predetermined distance from a threshold and setting a designated region which is within the predetermined distance from the threshold; an in-region cell selection step of selecting a cell gradation value which is within the region range; an out-region cell selection step of selecting a cell gradation value which is outside of the region range; a cell value determination step of determining the type (white or black) of a cell based on the comparison results of the gradation value of the cell that is selected in the out-region cell selection step with the threshold; an adjacent cell gradation value detection step of detecting the gradation value of a cell that is adjacent to a target cell in respect to the cell that is selected in the in-region cell selection step; the first cell value determination step of determining the type of the target cell that is different from that of the adjacent cell in the case where all the adjacent cells are of the same type; and the second cell value determination step of determining the type of the target cell by comparing the gradation value of the target cell with the threshold in the case where all the adjacent cells are not of the same type.

BRIEF EXPLANATION OF THE FIGURES

FIG. 1 shows processing units used in a two-dimensional code recognition method according to the present invention;

FIG. 2 explains a method of determination of a threshold for a cell;

FIG. 4 explains a method of determination of the type of a cell by comparing it with four adjacent cells or eight adjacent cells (No. 2);

FIG. 5 shows four adjacent cells or eight adjacent cells;

FIG. 7 is a flowchart of the recognition processing of a QR code;

FIG. 10 is a flowchart of the detailed processing of step S304 of FIG. 9;

FIG. 13 explains one method of pre-processing according to the preferred embodiment of the present invention;

FIG. 18 explains a separation method of a two-dimensional code from a background color according to the preferred embodiment of the present invention (No. 2).

PREFERRED EMBODIMENTS OF THE PRESENT INVENTION

Figure 3:
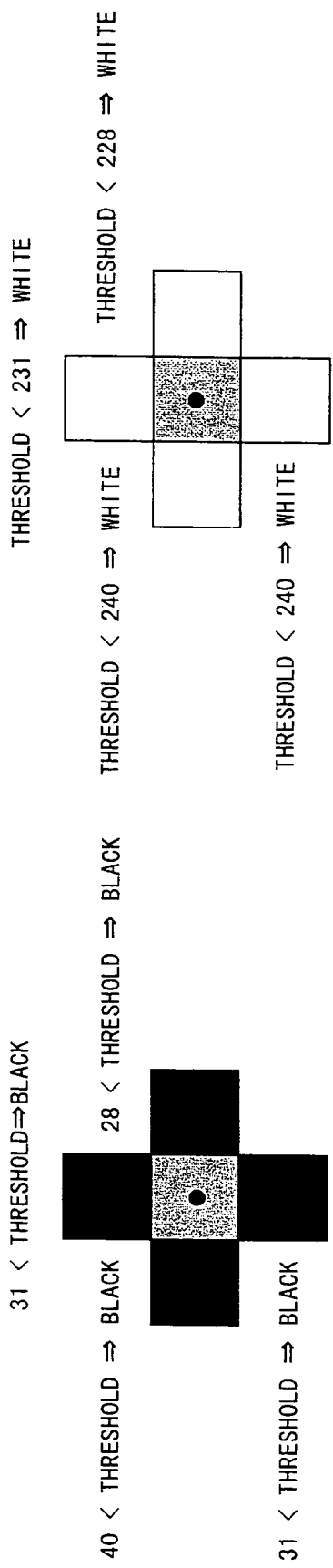
FIG. 3 explains a method of determination of the type of a cell by comparing it with four adjacent cells or eight adjacent cells (No. 1)

FIG. 1 shows the processing units used in a two-dimensional code recognition method of the present invention. In this figure, an image is read in an image reading unit 101 and then photoelectric conversion is performed in a photoelectric conversion unit 102. In the A/D conversion unit 103, an analog signal is converted into a digital signal. In the two-dimensional code recognition processing unit 104, the recognition processing of a two-dimensional code is performed and then the data character obtained from the recognition results of the two-dimensional code is output to a data character output unit 105. In the present preferred embodiment, especially portable terminals such as mobile phones, PDAs, etc. are included in the target apparatus. In apparatus of these kinds, built-in cameras for taking photographs are widely used. Recently, a technology of reading two-dimensional barcodes making use of such cameras and loading the recognized text data into the apparatus, so as to simplify text input, have been proposed. In respect to two-dimensional code images read from an optical apparatus, one cell includes a plurality of pixels. Therefore, it is necessary to determine which type (black or white) each cell is. First, the coordinate value of a cell of the code image is obtained and then a gradation component of the cell is obtained. The coordinate value is set at the center of the cell. Then, the cell type is determined by processing a gradation component of the cell, etc. using the threshold. Then, a threshold for determining the type of cell is determined. FIG. 2 explains the method of determination of the threshold for determining a cell.

In the case where the light intensity is low or the range of sensor sensitivity is narrow (in the case where the variation of gradation value is narrow), etc., the value of a cell cannot be precisely converted by a conversion method using a fixed threshold (for example, in the case where all the gradations are represented by two hundred and fifty five gradation values, the threshold is set to 128, that is the mid-value). For example, in the case where the light intensity is low, the range of gradation values is reduced to a low level and "thinning" or "squashing" of the photographed image occurs. Many two-dimensional codes are represented by a white/black binary. Therefore, the histogram of an input image has two peaks corresponding to light and dark regions (refer to FIG. 2). By setting the midpoint between the two peaks as the threshold, conversion processing without "thinning" or "squashing" can be performed. Each of FIGS. 3 and 4 explains a method of determination of the type of cell by comparison with either four or eight adjacent cells. In respect to the isolated cell surrounded by the cells of different types in four or eight directions, the gradation value is influenced by the adjacent cells in the case where the optical resolution is low or the apparatus cannot maintain focus. Consequently, the value of the cell cannot be precisely converted by a binarizing method using a threshold alone. For example, in respect to a white cell surrounded by black cells, the gradation value is decreased by the influences of the surrounding black cells and accordingly, the white cell is sometimes misidentified as a black cell depending on the threshold. As shown in FIG. 3, the gradation value of a target cell and that of an adjacent cell are compared and the target cell is converted into a value that is different from that of the adjacent cell in the case where the difference between the gradation values is equal to or greater than a predetermined value. In the case where there are both a black value and a white value (not isolated dots) in the adjacent cells, the influence of the adjacent cells is small. Only in the case where all the adjacent cells have the same value, is the dot regarded as an isolated dot and conversion processing is performed. In respect to the influence of eight adjacent cells, the influences in the horizontal and vertical directions are large, and the influences in the oblique directions are small. However, in the case where only the adjacent cell on the left side is white and the others are all black, as shown in FIG. 4, however, the gradation value of the target cell is influenced by the black cells. In the case where eight adjacent cells are used, processing identical to that of the isolated element is performed, for example, when seven cells out of eight adjacent cells are of the same type, even if all the adjacent cells do not have the same value.

Figure 6:
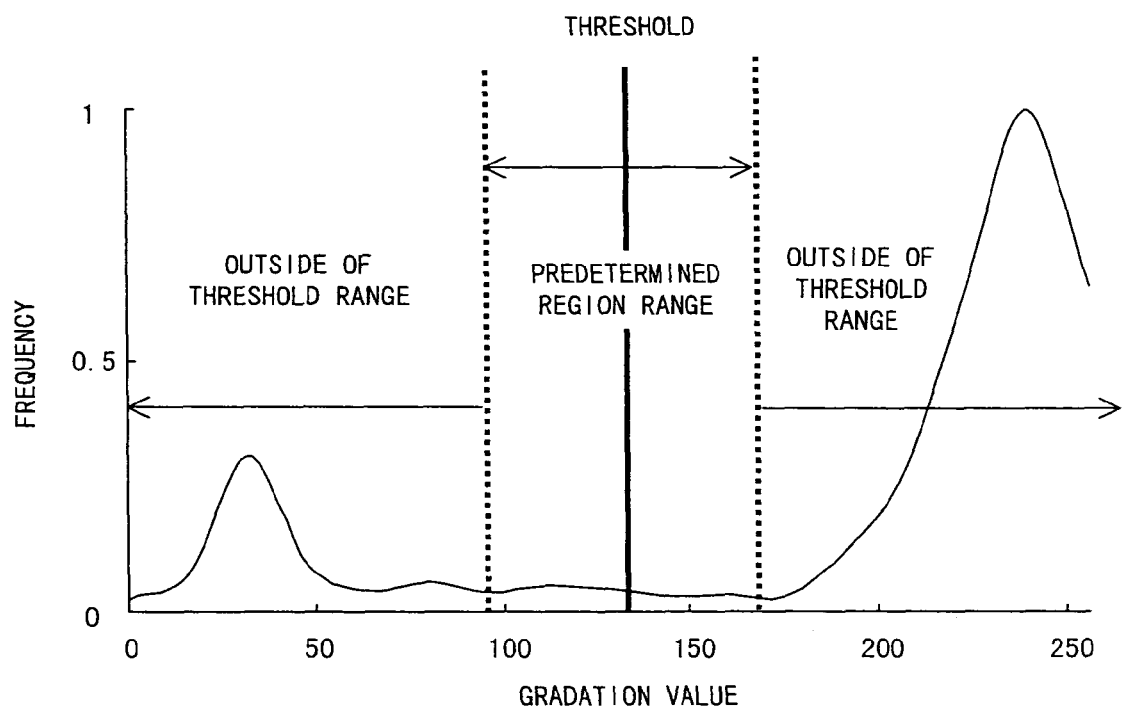
FIG. 6 explains a method of determination of the type of a cell according to the preferred embodiment of the present invention.

That is, in the left figure of FIG. 3, since the gradation values of four adjacent cells surrounding a center cell are 31, 40, 31 and 28, these cells are determined to be black in the case where the threshold is set to 128. At this time, in the case where the adjacent cells are all black even if the gradation value of the central cell is equal to or less than the threshold and the difference between the gradation value of the central cell and that of the adjacent cells is equal to or greater than a predetermined value, it is determined that the central cell is white. In the right figure of FIG. 3, in the case where the gradation values of four adjacent cells are 231, 240, 240 and 228 and the threshold is set to 128, all the adjacent cells are white. Here, when the gradation value of the central cell is set to 143, that is equal to or greater than a threshold, it is determined that the central cell is black in the case where all the surrounding cells are white and the difference between the gradation value of the central cell and those of the surrounding cells is equal to or greater than a predetermined value. In the left figure of FIG. 4, in the case where all eight adjacent cells are black, it is determined that a central cell is white in the case that all the adjacent cells are black (equal to or less than a threshold) and the difference between the gradation value of the central cell and those of the adjacent cells is a predetermined value even if the gradation value of the central cell is equal to or less than a threshold. In the right figure of FIG. 4, seven cells out of the eight adjacent cells are black and one cell is white. In this case, also, the gradation value of the central cell and those of adjacent cells each of which has a value equal to or less than a threshold are compared and it is determined that the central cell is white in the case where the difference is equal to or greater than a predetermined value. Conversely, in the case where the central cell is surrounded by white adjacent cells, it is determined in a similar manner to the case above that the central cell is black. As mentioned above, even in the case where the central cell is surrounded by cells of different types, conversion processing can be precisely performed. FIG. 5 shows four and eight adjacent cells. As shown in FIG. 5, four adjacent cells surround a central cell in the horizontal and vertical directions of the central cell. In addition, eight adjacent cells are obtained by further adding adjacent cells in four oblique directions. As mentioned above, the cells in the oblique directions have little influence on the gradation value of the central cell in comparison to the original four adjacent cells since these cells are further away from the center cell. FIG. 6 explains the method of determination of cell type according to the preferred embodiment of the present invention.

As shown in FIG. 6, in the histogram of gradation values, the threshold is centered within a predetermined range and the method of determination of the type of cell is changed depending on the determination of whether or not the gradation of a cell falls within this predetermined range. As shown in FIG. 6, with respect to the cells within the region range, the values of the cells are determined in comparison with the values of adjacent cells, as described above. The cells outside the range are classified into white cells and black cells by comparison to the threshold. By setting a gray zone having a predetermined range from a threshold, it is possible to distinguish the cells that are apparently influenced by the adjacent cells from those that are not influenced. As shown in FIG. 6, a region having a certain predetermined range is set while centering a threshold. Accordingly, in the case where an isolated cell or most of the adjacent cells is/are different in value from the target cell, the gradation value of the target cell is influenced by a different direction so that the value becomes the value in the vicinity of the threshold. By setting a region having a predetermined range from the threshold, it is possible to distinguish cells that are influenced by adjacent cells from those that are not influenced by adjacent cells. With respect to cells outside the range, the values of such cells are determined by comparison with the threshold. By performing processing after distinguishing a cell that is influenced by adjacent cells from a cell that is not influenced by adjacent cells, it becomes possible to obtain an accurate value for the cell without error.

The following is a summary of the processes that are explained above. In order to obtain the values of cells that are placed in a two-dimensional matrix as a pattern, a coordinate value of a cell in an image memory space is first detected. Then, the gradation value of a cell in the detected coordinates is obtained. Subsequently, a histogram of gradation components of the cell is prepared and the threshold is determined. The predetermined region with a certain width around the threshold is provided range, thereby distinguishing cells that are influenced by adjacent cells from those that are not influenced by adjacent cells. Then, in respect to cells within the region, the value of the cell is determined in comparison with the adjacent cell. If the cell is outside the region, the value of the cell is determined in comparison with the threshold.

By performing the above-mentioned process, the value of a cell can be precisely converted and a two-dimensional code can be read without decreasing the recognition accuracy in the case where the optical resolution is low or the optical apparatus is out-of-focus. The following is a description of the process performed according to the preferred embodiments of the present invention. In the case where an image of the code to be recognized is photographed by a moving recognition apparatus with a camera, there is generally insufficient time for recognition processing, which generally requires more time than the time required to photograph a single image. Consequently, the functionality of a user interface is reduced since the number of images to be displayed for each unit of time decreases. The following processes are performed to mitigate this problem. A pre-processing unit for evaluating whether or not code is included is provided and actual recognition processing is performed only in the case where it can be determined that the target is a code, based on the determination results of the pre-processing unit. Consequently, the functionality of the user interface is enhanced by increasing the number of recognition processes for each unit of time and virtually increasing the perceived recognition processing speed for each unit of time, thereby increasing the number of images to be displayed. Conventionally, in the case where one-dimensional and two-dimensional codes are to be recognized, a user determines which code is to be recognized and switches the recognition process manually. In the pre-processing unit, the image characteristics of one-dimensional and two-dimensional code regions are identified, and recognition processing of the one-dimensional code or two-dimensional code is performed in accordance with the determination results so that recognition processing is automatically switched. Two-dimensional codes are characterized by white dots and black dots with a ratio of approximately one to one (1:1) and they are distributed in two-dimensions. Therefore, pre-processing for determining whether or not the small region (X,Y) of an image is a two-dimensional code region can be performed using one or more characteristics of pixel gradation dispersion, the ratio of black pixels to all pixels and the number of black and white edges (height and width). A one-dimensional code is characterized in that it includes a plurality of vertical lines each having a certain length. Therefore, pre-processing for determining whether or not the small region (X,Y) of an image is a one-dimensional code region can be performed using one or more characteristics from among pixel gradation dispersion, the numbers of white edges and black edges (horizontal) and the line correlation. Conventionally, in the case where the image of a code to be recognized is photographed by a moving recognition apparatus with a camera and then a recognition processing is performed, the image is photographed using the exposure control method of a still image and an image securing a broad gradation range is photographed by performing multiple-exposure processing (long-shuttering) for images of a plurality of frames while exceeding the reading time of image data of one frame of a sensor, in order to virtually increase the apparent sensitivity of the sensor especially under low light conditions. However, there is a problem such that an indistinct image is obtained for a moving target by multiple-exposure of a plurality of frames and consequently the recognition performance is reduced. The following processing addresses this problem. By limiting the exposure time of a camera so that it is within the reading time of the data of a camera, image data suitable for recognition is obtained even under low light conditions, thus recognition apparatus with enhanced recognition performance is achievable. Conventionally, a two-dimensional code includes a white cell, a black cell and N white cells for indicating the boundary of the two-dimensional code. In order to extract the region of a two-dimensional code, N white cells following a black cell are detected and the rectangular area that is obtained by connecting the detected boundaries can be extracted as a two-dimensional code region. Conventionally, since a two-dimensional code is an aggregation of white and black cells that are meaningless to a user, the code is printed in such a way that the boundary region, etc. is surrounded by a color. Two peaks are obtained by a simple fixed threshold or a histogram of gradation. When it is determined whether a cell is white or black using the determined threshold, the area outside the colored boundary region is also determined to consist of black cells and accordingly, the region of a two-dimensional code sometimes cannot be extracted at the time of determining the boundary. The following is a process to address this problem. In the histogram of an input image, there are three peaks, one in the dark region, one in the light region and one in the intermediate region corresponding to the background. The threshold is determined by the black cell level determining process for determining the level range on the dark side of the peak. Then, the value of a cell is obtained using the determined threshold and a code boundary is detected using the continuous lengths of a black cell and a non-black cell, thereby precisely extracting a two-dimensional code. The following is a detailed explanation of the above. Here, a two-dimensional code is explained taking a QR code as an example. The same processing can be performed for other types of two-dimensional code. In respect to the detailed explanation of QR code recognition, please refer to JIS standards "JIS X 0510: two-dimensional code symbol-QR code-basic specification explanation".

FIG. 7 is a QR code recognition processing flowchart. In step S101, recognition processing of a white/black cell is performed. Most of the processing of the present invention is related to the details of step S101. In step S102, format information included in the QR code is decoded. The format information includes the model number of the QR code that is coded and described at a predetermined position of the QR code and the type of the mask. In step S102, the coded code is decoded. In step S103, a model number is determined based on the read-out format information and the mask processing is canceled in step S104. When a QR code that is a type of two-dimensional code is generated, the allocation of black cells and white cells in a two-dimensional plane is non-uniform, and favors the white side or the black side if the format information is simply encoded in a two-dimensional code. At this time, mask processing is performed to make the allocation of white cells and black cells uniform by superimposing one QR code of a predetermined set of masks with a two-dimensional code.

In step S105, data and error correction code words are restored from the two-dimensional code obtained by canceling the mask processing. In step S106, it is determined whether or not there is an error in the restored data using the error correction code. If it is determined there is an error in step S106, the error is corrected in step S107 and once there is no error, the processing advances directly to S108. In step S108, the data word is decoded, in step S109, the decoded data code word is output and the processing terminates.

Figure 8:
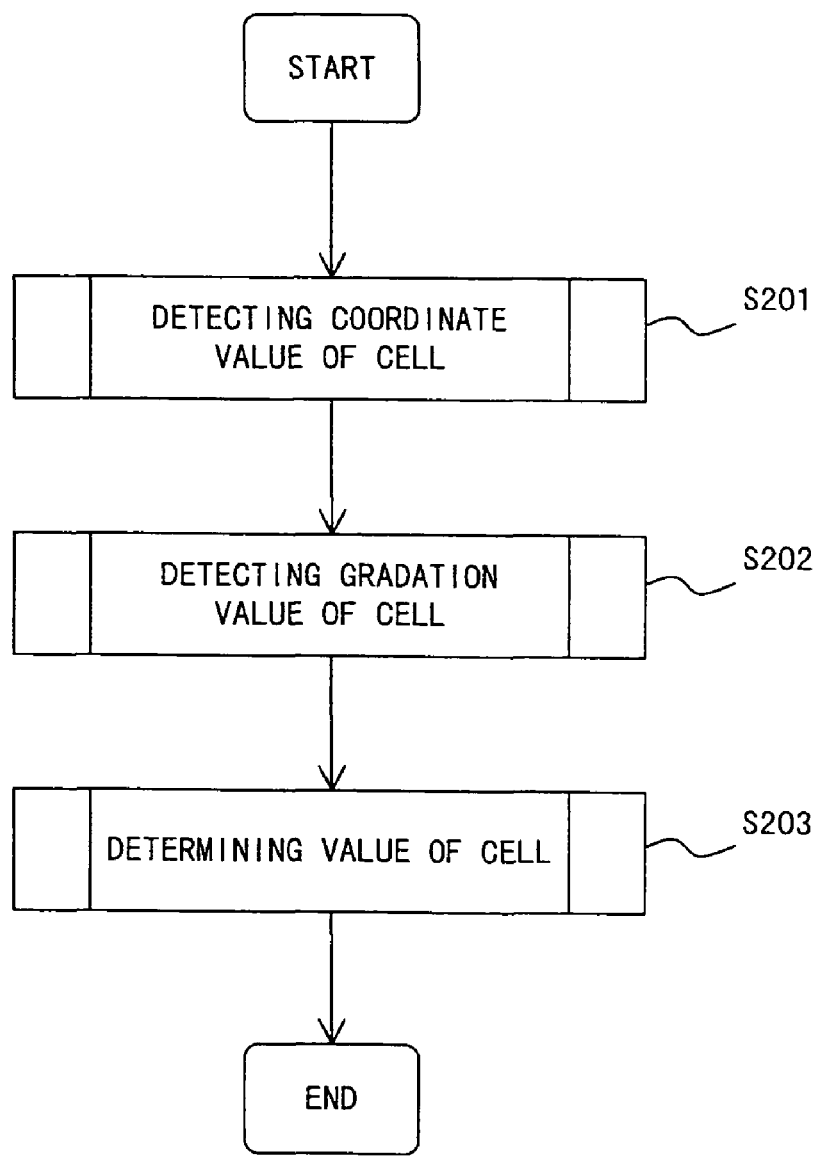
FIG. 8 is a flowchart of a two-dimensional code recognition method according to the preferred embodiment of the present invention.

FIG. 8 shows a flowchart of a two-dimensional recognition method according to the preferred embodiment of the present invention. In step S201, in order to obtain the values of cells that are arranged in a two-dimensional matrix as a pattern, the coordinate value of a cell in an image memory space is firstly obtained from the image input by an optical apparatus. In respect to the calculation method of the coordinate value of a cell, a method described in "JIS X 0510: two dimensional code symbol-QR code-basic specification comments" is used. In step S202, the gradation value of a cell on the detected coordinate is obtained.

In step S203, the value of a cell is determined.

Figure 9:
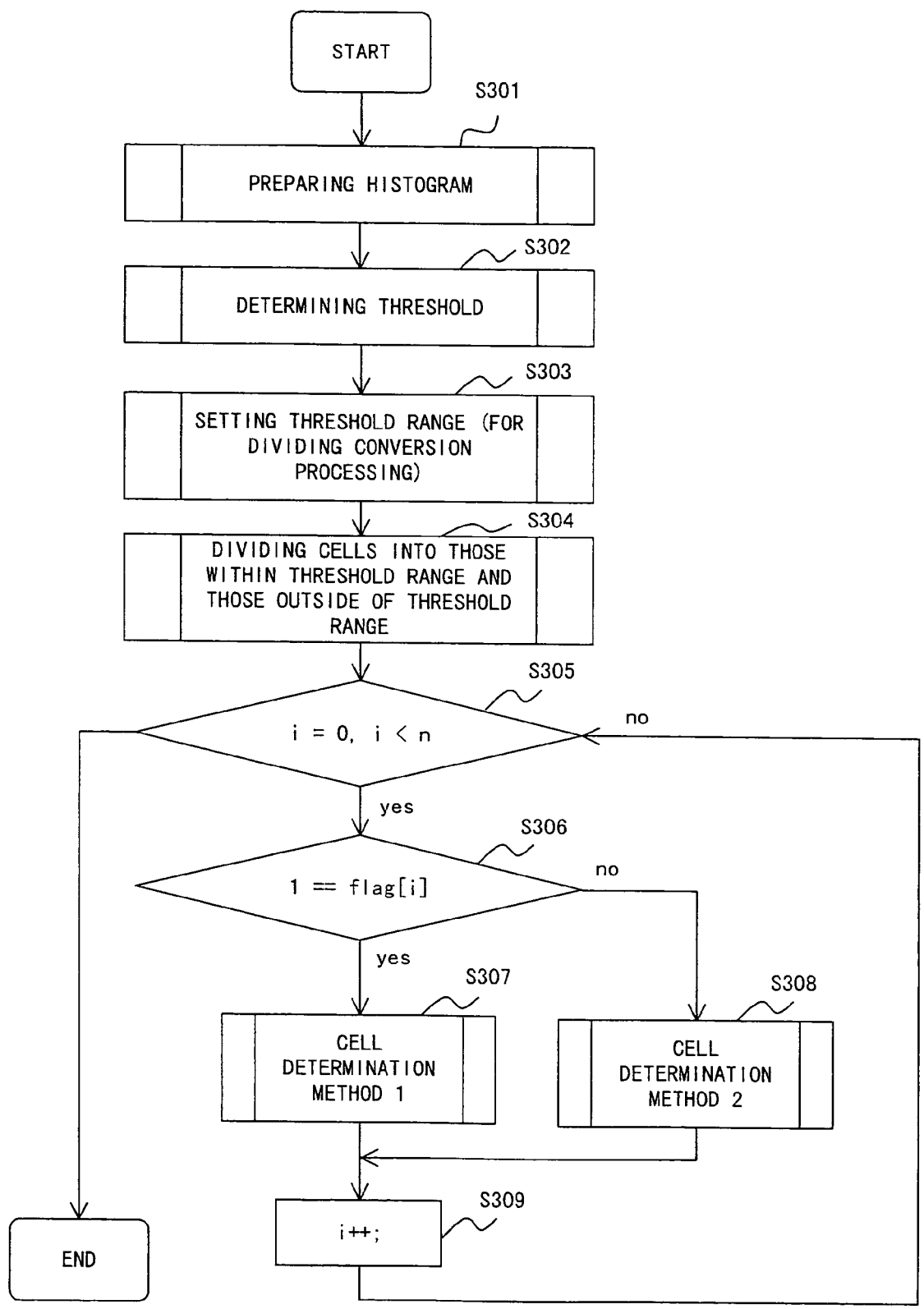
FIG. 9 is a flowchart of the detailed processing of step S203 of FIG. 8.

FIG. 9 is a flowchart of the detailed process of step S203 of FIG. 8. In step S301, the frequency of a gradation component of a cell is obtained and a histogram is prepared. A histogram is prepared from the gradation component of a pixel included in a code region.

In step S302, a threshold is determined. A histogram is scanned from the left side (dark) and a gradation component having a frequency which is equal to or greater than a predetermined value is detected, thereby obtaining the peak position in the region where the gradation component is low. Similarly, the histogram is scanned from the right side (light) and a gradation component having the frequency which is equal to or greater than a predetermined value is detected, thereby obtaining the peak position in the region where the gradation component is high. Then, the value of the point equidistant between the two peak positions is obtained to be set as the threshold (see FIG. 2). In step S303, the region range is set. For example, the X axis is examined in the histogram of FIG. 2 and the span between the peak that is generated in a region with a low gradation value and a threshold is divided into m intervals. The range to be obtained is separated from the threshold by n/m. Similarly, in a region with a high gradation value, the range to be obtained is separated from the threshold by n/m, where it should be noted that n is a value that does not exceed m. In step S304, cells are divided into those within a region range and those outside a region range. In steps S305 to S309, cells stored in a two-dimensional code are converted. Each parameter is set as follows:

a) data[i]: Gradation value of a cell b) i: Cell number c) n: Total number of cells d) flag[i]: Determination of whether cells are within a region or outside a region 1: Outside region 0: Within region The parameter of d) is obtained in step S304. In step S305, it is determined whether or not all the cells have been converted. In step S306, the processing is divided into two processes determined by the value of flag[i]. When the flag[i] is 1, the processing advances to a determination method 1 of a cell in step S307. When the flag[i] is 0, the processing advances to a determination method 2 of a cell in step S308. Cells that advance to a step S307 are cells that are outside the region range of a histogram and the value of the cell is determined by comparison with the threshold. Cells that advance to step S308 are cells that are within the region range of a histogram and the value of the cell is determined by comparison with the adjacent cells. In step S309, the cell number is incremented by one and the processing advances to step S305. When conversion processing has been performed for each of the cells, the process terminates. FIG. 10 is a flowchart showing details of the process in step S304 of FIG. 9. In the flowchart of this figure, it is determined whether each cell is within the region range or outside of the region range. This determination is made for every cell and the value of the flag[i] is set as the determination is made. The following are the relevant parameters together with the parameters identical to those of a) to d) above.

e) thresh1: Region range threshold in region where gradation value is low f) thresh2: Region range threshold in region where gradation value is high In step S401, the cell number is initialized.

In step S402, it is determined whether or not flag[i] has been obtained for all of the cells. In step S403, the gradation values of cells are compared and it is determined whether the cells are within the region range or outside of the region range. In step S404, if the gradation value is within the region range, 0 is substituted to flag[i].

In step S405, if the gradation value is out of the region range, 1 is substituted to flag[i].

Figure 11:
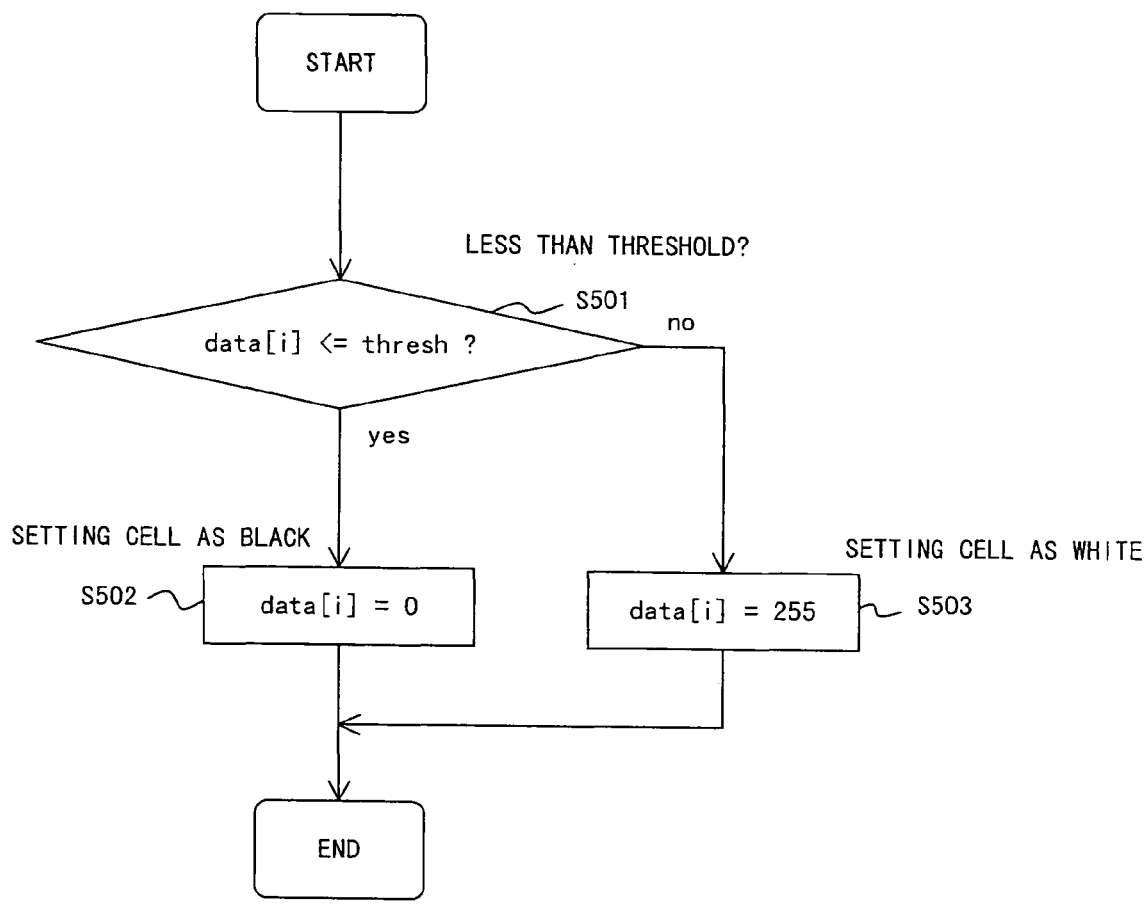
FIG. 11 is a flowchart of the detailed processing of step S307 of FIG. 9.

In step S406, the cell number is incremented by one and the processing advances to the next cell. When the value of flag[i] has been obtained for all of the cells, the process terminates. FIG. 11 is a detailed flowchart of the processes in step S307 of FIG. 9.

The process of FIG. 11 operates on cells outside the region range and the gradation value of the cell is determined by comparison with the threshold. In step S501, the gradation value and the threshold are compared.

In step S502, in the case where the gradation value is smaller than the threshold, the value of the cell is determined to be black (0).

In step S503, in the case where the gradation value is greater than the threshold, the value of the cell is determined to be white (255). In respect to the value of a cell, 0 signifies black and 255 signifies white, and all other intermediate values are applicable.

Figure 12:
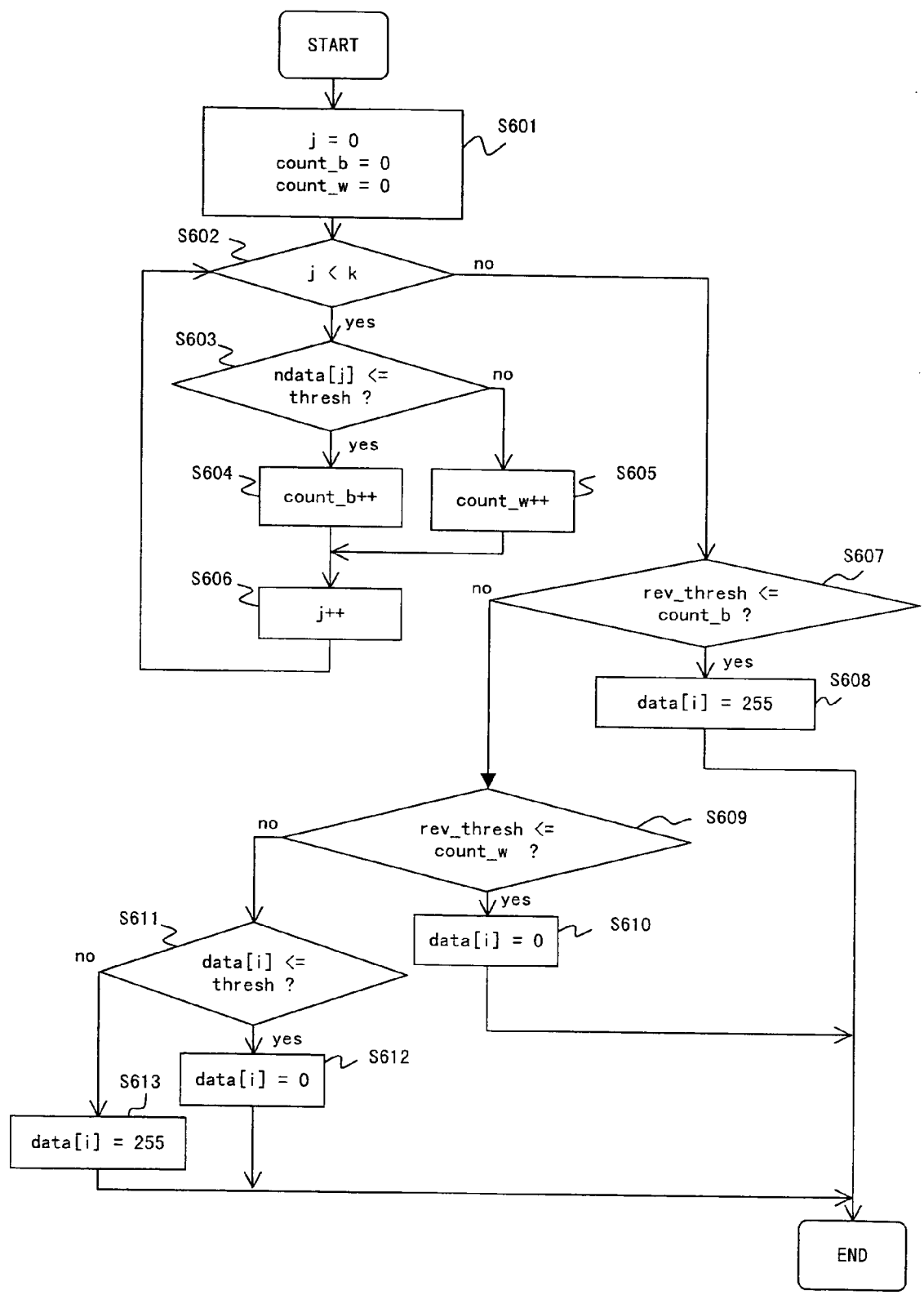
FIG. 12 is a flowchart of the detailed processing of step S308 of FIG. 9.

FIG. 12 is a detailed flowchart showing the process in step S308 of FIG. 9.

The process operates on cells within the region range and the value of the cell is determined by comparison with the adjacent cells. Each parameter is as follows:

j: Adjacent cell number k: The number of adjacent cells
   k=4 in case of four adjacent cells
   k=8 in case of eight adjacent cells count_b: The number of black pixels of adjacent cells count_w: The number of white pixels of adjacent cells ndata[i]: Gradation value of an adjacent cell rev_thresh: In the case where the number of adjacent cells is equal to or greater than this number, the type of the central cell is determined to be a value that is different from that of the adjacent cells In step S601, the parameter is initialized.

In step S602, it is determined whether or not the values of all the cells have been obtained.

In step S603, it is determined whether or not the gradation values (ndata[j]) of the adjacent cells exceed the threshold. If the gradation value is equal to or less than the threshold, the count of black cells is incremented by one in step S604. If the gradation value is equal to or greater than the threshold, the count of white cells is incremented by one in step S605. In step S606, adjacent cells are referred to one by one and the processing is advanced to the next step when the gradation values of all the adjacent cells have been determined.

In step S607, it is determined whether or not the number of black pixels of the adjacent cells is equal to or greater than the threshold. In step S608, if it is determined that the number of adjacent cells is equal to or greater than the threshold, the target cell is determined to have the value of a white cell and the process terminates.

In step S609, if the number of white pixels of the adjacent cells is equal to or greater than the threshold, the target cell is determined to have the value of a black cell and the processing terminates. In step S611, in the case where the target cell is not black or white, the gradation value of the target cell is compared with the threshold and the value of the target cell is determined. The target cell is determined to be black when the gradation value of the cell is equal to or less than the threshold while the target cell is determined to be white when the gradation value of the cell is equal to or greater than the threshold. Even in the case where the optical resolution of the apparatus is low and the apparatus cannot maintain focus, it becomes possible to precisely convert the value of a cell and read a two-dimensional code without decreasing the recognition accuracy by performing the above-mentioned processes.

FIG. 13 explains a pre-processing process according to the preferred embodiments of the present invention. In the case where the image is photographed by a moving recognition apparatus with a camera and the code is recognized in respect to a two-dimensional code to be recognized, the time required for recognition processing is generally greater than that required for a single exposure. Consequently, the functionality of the user interface is reduced as the number of images to be displayed for each of unit time decreases.

By providing a pre-processing unit for evaluating whether or not a two-dimensional code is included in a target image and performing the processing only in the case where it can be determined that the target image is a two-dimensional code, according to the determination results of the pre-processing unit, it becomes possible to enhance the functionality of a user interface since the number of recognition processes increases for each unit of time and the perceived recognition processing speed increases for each unit of time, thereby increasing the number of images to be displayed. In FIG. 13, when the code recognition process starts, an image to be recognized is obtained in step S700. In step S701, a preview image is prepared to be presented to a user. The thus-obtained image is pre-processed in step S702 and it is determined whether or not a two-dimensional code is included in the image in step S703. In the case where it is determined that code is not included in the image, an image to be recognized is obtained again. In the case where it is determined in step S703 that a two-dimensional code is included, the recognition processing of the two-dimensional code is performed in step S704. It is determined in step S705 whether or not the decoding processing is successful. In the case where the processing is unsuccessful, an image to be recognized is obtained again. In the case where the decoding processing is successful, the decode results are output in step S706 and the code recognition process terminates.

Only in the case where the following processes are performed for the photographed image as pre-processing and the following conditions are satisfied, is it determined that a two-dimensional code is included in the target image and recognition processing is performed. Pre-processing: In the case where the following conditions are satisfied in respect to the small region (X×Y pixels) of the photographed image, this small region is determined as a two-dimensional code region.

Figure 14:
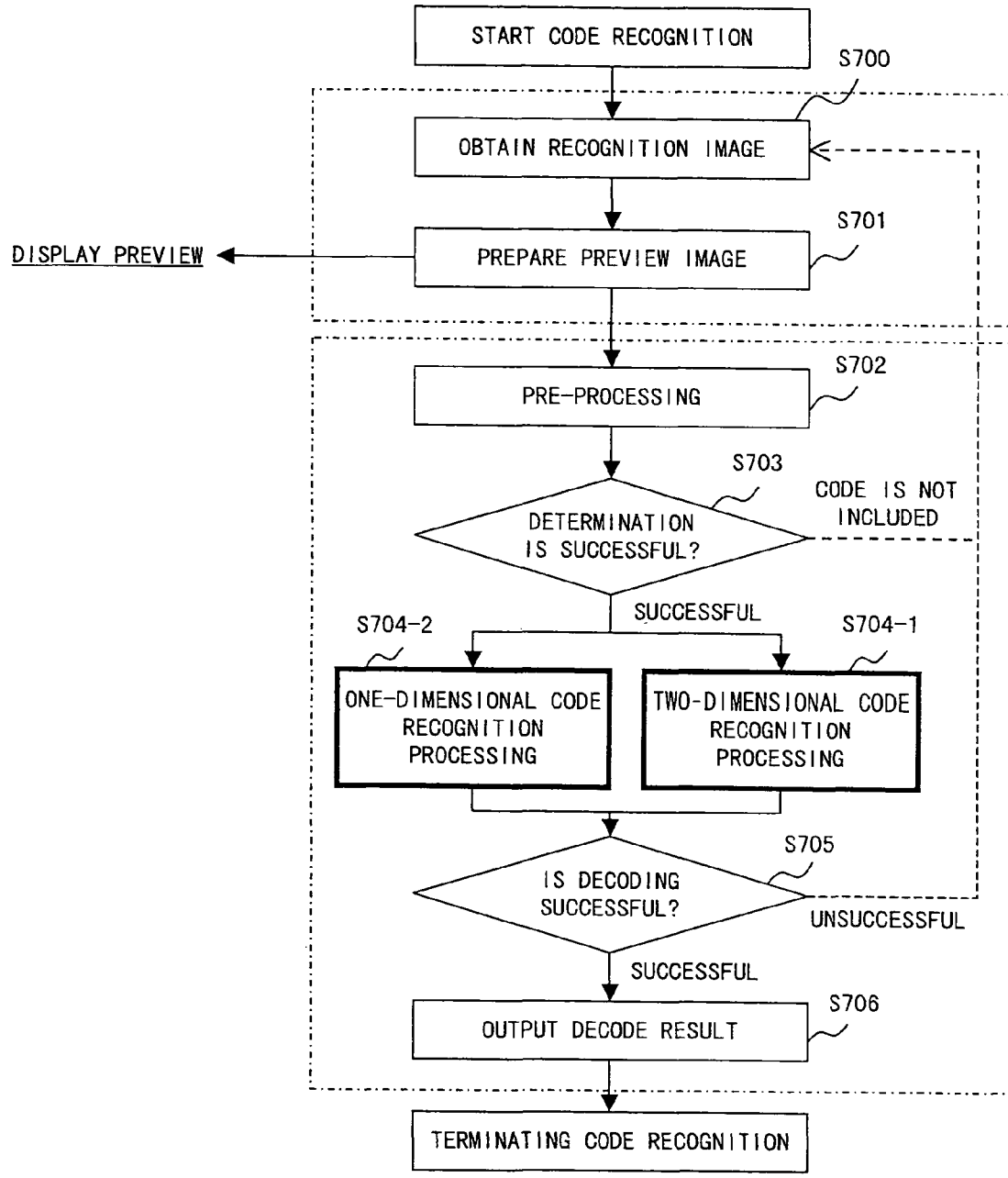
FIG. 14 explains another method of pre-processing according to the preferred embodiment of the present invention.

Gradation value dispersion of pixel (contrast)>$\alpha$ $\beta1$<ratio of black pixels to pixels<$\beta2$ The number of black and white edges (vertical and horizontal directions)>$\gamma$ Please note that $\alpha$, $\beta1$, $\beta2$ and $\gamma$ are experimentally determined in advance. FIG. 14 explains another embodiment of the pre-processing process according to the preferred embodiment of the present invention. In this figure, steps that are the same as those shown in FIG. 13 are denoted by the same reference numerals and the explanations associated with such numerals are omitted. Conventionally, in the case where a one-dimensional code and a two-dimensional code are to be recognized, a user determines the type of code and manually switches the recognition process to be performed.

In the present invention, a pre-processing unit is provided for evaluating whether or not a one-dimensional code or a two-dimensional code is included in a target image and recognition processing is only performed in the case where it can be determined that a one-dimensional code or two-dimensional code is included based on the determination result of the pre-processing unit. Consequently, the functionality of a user interface is enhanced by increasing the number of recognition processes for each unit of time and increasing the perceived recognition processing speed for each unit of time, thereby increasing the number of images to be displayed. At the same time, automatic recognition processing can be realized for one-dimensional and two-dimensional codes. The following processes are performed for the photographed image as pre-processes. Recognition processing is performed only in the case where it is determined that the codes are included in the image and the image satisfies the following conditions.

Figure 15:
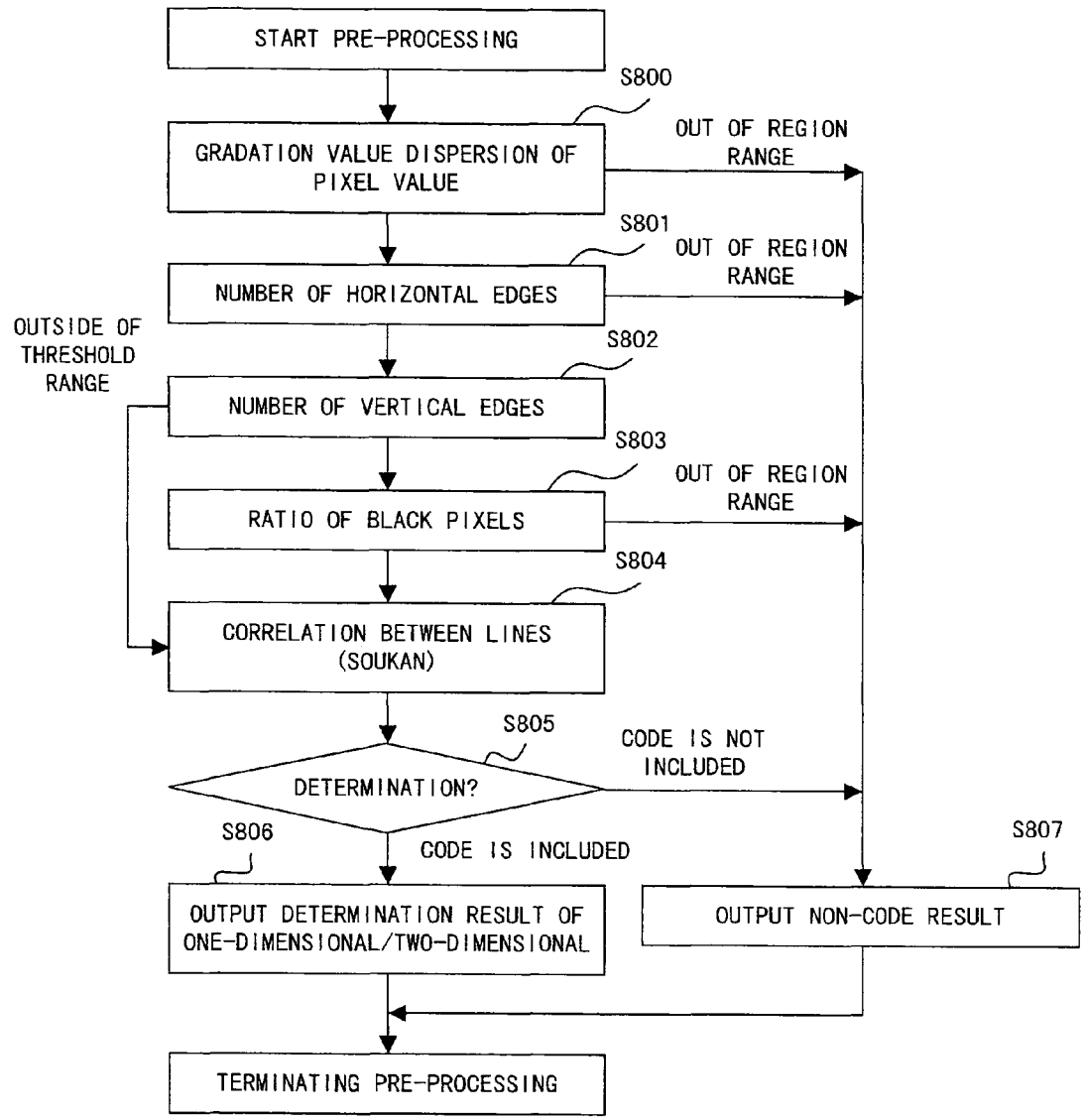
FIG. 15 is a flowchart of the pre-processing.

Pre-Processing:
  For a small region (X×Y pixels) of the photographed image,
  a two-dimensional code should satisfy the following conditions:
    Gradation value dispersion of pixel (contrast)>$\alpha$
      $\beta 1$<ratio of black pixels to pixels<$\beta 2$
      Number of black and white edges (vertical and horizontal)>$\gamma$
  One-dimensional code should satisfy the following conditions:
    Gradation value dispersion of pixel (contrast)>$\alpha$
    Number of black and white edges (horizontal)>$\theta$
    Line correlation=if correlation peak positions are identical between lines, it is determined that they are a two-dimensional code region or a one-dimensional code region. In the same way as in the case of FIG. 13, $\alpha$, $\beta 1$, $\beta 2$, $\gamma$, $\theta$, etc. are set to experimentally determined appropriate values. FIG. 15 is a flowchart showing the pre-process process.

Figure 16:
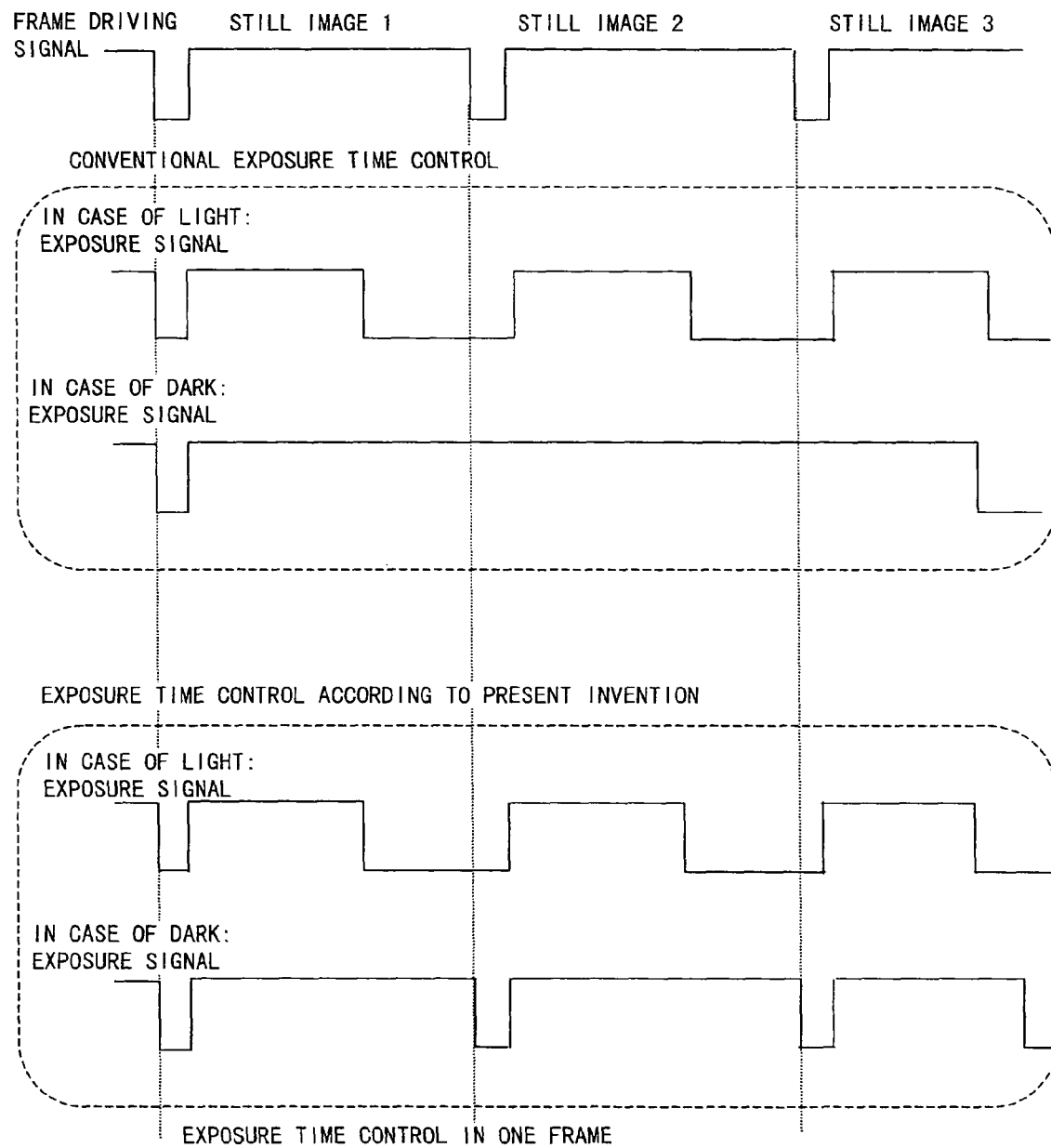
FIG. 16 explains a method of exposure time control when an image is photographed according to the preferred embodiment of the present invention.
Figure 17:
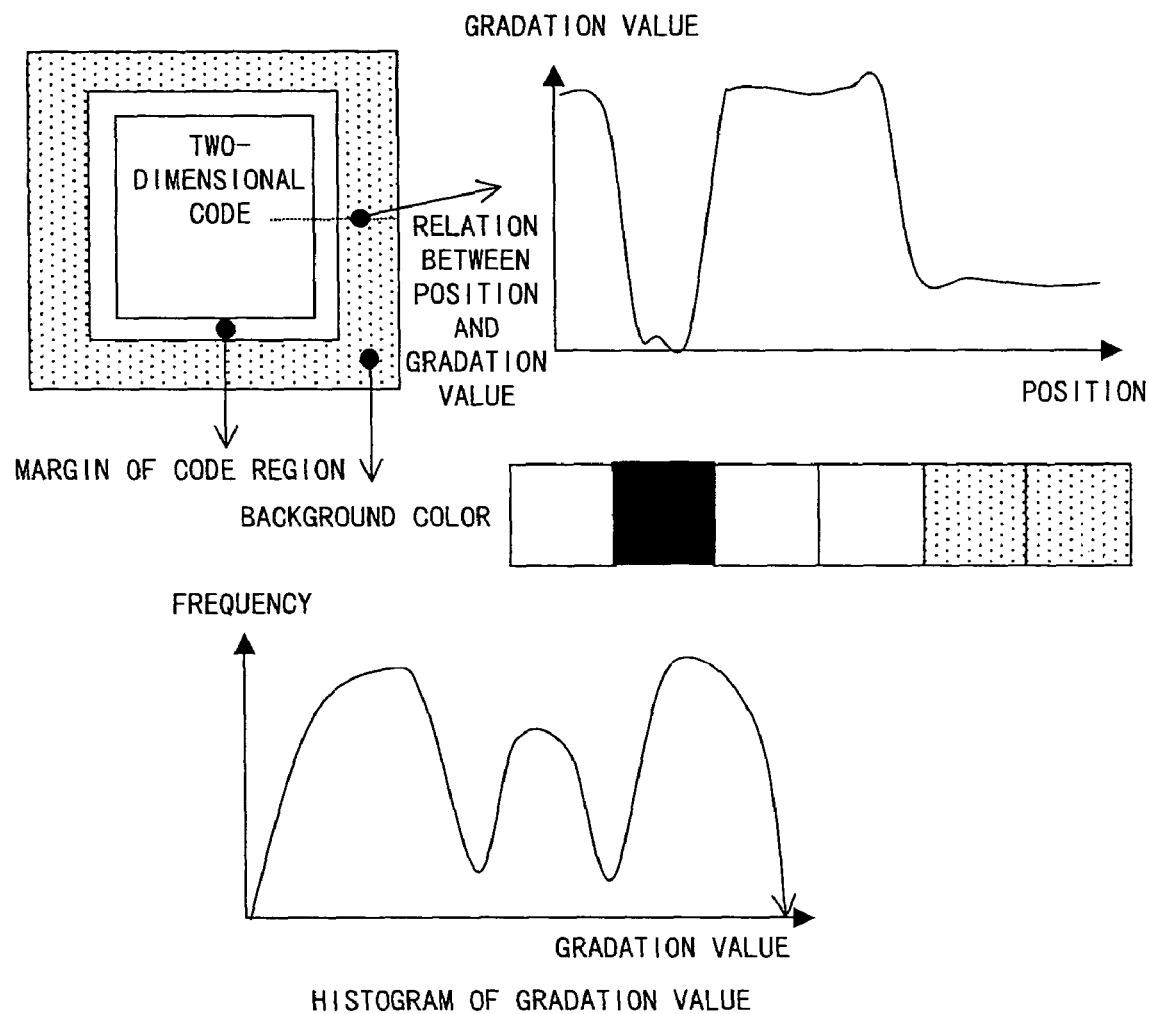
FIG. 17 explains a separation method of a two-dimensional code from a background color according to the preferred embodiment of the present invention (No. 1)

In step S800, it is determined whether or not the gradation dispersion of a pixel value is out of range. In the case where the gradation dispersion is out of range, a non-code result is output in step S807 and the pre-process terminates. In step S801, the number of horizontal edges is calculated and in the case that the number is out of range, the processing advances to step S807. In the case where the number is within the range, the number of vertical edges is calculated in step S802. In step S802, in the case where the number of vertical edges is out of range, the processing advances to step S804. In the case where the number of vertical edges is within range, the ratio of black pixels is detected in step S803. In the case where the number is out of range, the processing advances to step S807 and in the case where the number is within range, the processing advances to step S804. In step S804, the correlation between lines is obtained. In step S805, it is determined whether or not a code is included. In step S805, in the case where no code is included, the processing advances to step S807. In the case where it is determined in step S805 that code is included, a determination result showing whether the code is a one-dimensional code or a two-dimensional code is output in step S806 and the process terminates. FIG. 16 explains an exposure time control method used when an image is photographed according to the preferred embodiment of the present invention. Conventionally, in the case where an image is photographed to be recognized by a moving recognition apparatus with a camera, in respect to a two-dimensional code to be recognized, an image is photographed using the exposure control method of a still image. Especially, under low light levels, securing an image with a broad gradation is achieved by performing multiple-exposure (long-shuttering) for an image of a plurality of frames while exceeding the reading time of one picture image data of a sensor, in order to enhance the sensors sensitivity. By multiple-exposing a plurality of frames, an indistinct image is obtained due to the motion of the target, thereby decreasing the recognition performance (refer to FIG. 16: conventional exposure time control). According to the preferred embodiment of the present invention, a recognition apparatus with an enhanced recognition performance can be offered by restricting the exposure time of a camera within the frame driving interval of a camera (refer to FIG. 16: an exposure time control of the present invention) and by photographing a crisp image that is suitable for recognition under low light and that can follow the motion of a target. Each of FIGS. 17 and 18 explains separation methods of a two-dimensional code from a background color. Conventionally, a two-dimensional code includes a white cell, a black cell and N white cells for indicating a boundary of the two-dimensional code. In order to extract the region of a two-dimensional code, N white cells following a black cell are detected and then a rectangular area that is obtained by connecting the detected boundaries is extracted as a two-dimensional region. Since a two-dimensional code is an aggregation of meaningless black and white cells to a user, from the design viewpoint the code is printed and used by surrounding the boundary region with a color, etc. Two peaks in gradation values are obtained to determine a threshold, either by a simple fixed threshold or a histogram. When it is determined whether the cell is black or white using the determined threshold, the area outside the colored boundary region is also determined to consist of black cells and accordingly, the region of a two-dimensional code cannot always be extracted at the time of determining the boundary. As shown in FIG. 17, there are three peaks corresponding to a dark region, a light region and an intermediate region in the histogram of an input image. The threshold is determined by the above-mentioned black cell level determination method (in FIG. 2, a threshold is set to a black level) determining a level threshold range on the dark side of that peak. Then, the value of a cell is obtained using the determined threshold and a code boundary is detected using the continuous length of a black cell and a non-black cell, thereby precisely extracting a two-dimensional code. FIG. 18 shows the relation between the gradation value of the boundary part of a two-dimensional code and the recognized cell. The part that is not conventionally determined as a boundary can be precisely determined by the present invention. Therefore, it becomes possible to precisely extract a two-dimensional region by extracting a rectangular region obtained by connecting the detected boundaries.

According to the present invention, in the case where the optical resolution of a reading apparatus is low and focus cannot be maintained, the value of a cell can be precisely converted so that a two-dimensional code can be read without decreasing the recognition accuracy. By using a recognition method of the present invention, it is possible to offer a two-dimensional code reading apparatus with high recognition accuracy.

Furthermore, the number of images to be displayed is increased by increasing the recognition processing speed for each unit of time based on the determination of pre-processing, thereby enhancing the functionality of the user interface. Additionally, since image data suitable for recognition can be photographed even under low light conditions, recognition apparatus with enhanced recognition performance can be achieved.

What is claimed is:

1. A two-dimensional code recognition method of recognizing a two-dimensional code that is obtained by generating cells from data and is arranged in two dimensions, comprising:
   detecting a coordinate of a target cell;
   obtaining a gradation value of the detected coordinate;
   determining a value of the target cell from the detected gradation value using a processing unit of a portable terminal; and
   outputting a codeword corresponding to the value, thereby recognizing the two dimensional code.

2. A two-dimensional code recognition method of recognizing a two-dimensional code that is obtained by generating cells from data and is arranged in two dimensions, comprising:
   obtaining a gradation value of a target cell;
   preparing a histogram by obtaining a frequency of a gradation value of an image;
   obtaining a first gradation value that is equal to or greater than a predetermined value and is present on a light side of the histogram;
   obtaining a second gradation value that is equal to or greater than a predetermined value and is present on a dark side of the histogram;
   setting an intermediate value of the obtained first and second gradation values as a threshold;
   comparing the gradation value of the target cell with the threshold and determining a type of the target cell using a processing unit of a portable terminal; and
   outputting a corresponding codeword, thereby recognizing the two dimensional code.

3. The two-dimensional code recognition method according to claim 2, wherein in respect to the threshold detected in the histogram preparation and the threshold value detection, the cell determination is performed only for a cell that is present in a predetermined threshold range between a predetermined gradation value on the light side and that on the dark side including the threshold itself.

4. A two-dimensional code recognition method, comprising:
   comparing a gradation value of a target cell with that of an adjacent cell;
   determining a value of the target cell based on the gradation value comparison results of adjacent cells using a processing unit of a portable terminal; and
   outputting a codeword corresponding to the value thereby recognizing the two dimensional code.

5. The two-dimensional code recognition method according to claim 4, wherein the adjacent cells are four adjacent cells in the X and Y directions.

6. The two-dimensional code recognition method according to claim 4, wherein the adjacent cells are eight adjacent cells in the X and Y directions.

7. The two-dimensional code recognition method according to claim 4, wherein the determining is performed only for a cell a gradation value of which is in the predetermined region range.

8. The two-dimensional code recognition method according to claim 4, wherein the cell value determination selects a cell a gradation value of which is outside the predetermined region range and determines the value of the cell by comparing the selected cell with the threshold.

9. A two-dimensional code recognition method, comprising:
   comparing a gradation value of a target cell and that of an adjacent cell;
   comparing the gradation value of the adjacent cell with a threshold;
   determining a type of an adjacent cell from the comparing;
   determining the type of the target cell that is different from that of the adjacent cell in a case where adjacent cells are all of a same type or a predetermined number of adjacent cells are of a same type using a processing unit of a portable terminal; and
   outputting a corresponding codeword, thereby recognizing the two dimensional code.

10. A two-dimensional code recognition method of recognizing a two-dimensional code that is obtained by generating cells from data and is arranged in two dimensions, comprising:
    detecting a coordinate value of a target cell;
    obtaining a gradation value of the detected coordinate;
    obtaining frequencies of gradation values of an image and preparing a histogram;
    obtaining a threshold from the histogram;
    obtaining a predetermined distance from the threshold and setting the predetermined distance from the threshold as a designated region range;
    selecting a cell a gradation value of which is within the region range;
    selecting a cell a gradation value of which is outside of the region range;
    determining a type of the cell selected in the out-region range cell selection based on the comparison results of the gradation value and the threshold using a processing unit of a portable terminal;
    detecting a gradation value of a cell adjacent to a target cell among cells selected in the in-region cell selection;
    determining a type of the target cell that is different from that of the adjacent cell in a case where all adjacent cells are of a same type;
    determining the type of the target cell in comparison with the threshold in a case where all adjacent cells are not of the same type; and
    outputting a corresponding codeword, thereby recognizing the two dimensional code.

11. A two-dimensional code boundary recognition method, comprising:
    obtaining a frequency of gradation values of an image and preparing a histogram;
    determining a black cell by determining a level range region on the dark side using the histogram using a processing unit of a portable terminal; and
    detecting a code boundary using a continuous length of a black cell and a non-black cell that are obtained in the black cell determining outputting a corresponding code boundary recognition, thereby recognizing the code boundary.

12. A code recognition apparatus for inputting an image and recognizing a code, comprising:
    a portable terminal comprising:
      a camera for inputting the image; and
      a plurality of pre-processing units for comparing a gradation value of a target cell in the image with that of an adjacent cell and determining a value of the target cell based on the gradation value comparison results of adjacent cells, thereby recognizing the code.

13. The apparatus as recited in claim 12, wherein the pre-processing unit determines whether or not a small region of the image is a two-dimensional code based on one or more values of pixel gradation dispersion, ratio of black pixels to pixels and a number of black and white edges.

14. An apparatus that can be used for code recognition apparatus, comprising:
- a portable terminal comprising:
  - a camera for inputting an image; and
  - a plurality of pre-processing units for determining whether a code is included or not,
- wherein the image is immediately updated in a case where the determination result is negative,
- wherein the pre-processing unit determines characteristics of images of a one-dimensional code region and performs recognition processing of a one-dimensional code based on the determination results, and
- wherein the pre-processing unit determines whether or not a small region of the image is a one-dimensional code based on one or more values of pixel gradation dispersion, the ratio of black pixels to pixels, a number of black and white edges and line correlation.

15. The apparatus as recited in claim 14, for inputting an image from the camera and recognizing a code, wherein exposure time of the camera does not exceed the period of one frame of the camera.

16. The apparatus as recited in claim 14, wherein the code comprises a bar code.

17. The apparatus as recited in claim 14, wherein the determining determines whether code recognition processing can be performed.

18. An apparatus that can be used for code recognition apparatus, comprising:
- a portable terminal comprising:
  - a camera for inputting an image; and
  - a plurality of pre-processing units for determining whether a code is included or not,
- wherein the image is immediately updated in a case where the determination result is negative,
- wherein the pre-processing unit determines characteristics of images of a two-dimensional code region and performs recognition processing of a two dimensional code based on the determination results, and
- wherein the pre-processing unit determines whether or not a small region of the image is a two-dimensional code based on one or more values of pixel gradation dispersion, ratio of black pixels to pixels and a number of black and white edges.

* * * * *

UNITED STATES PATENT AND TRADEMARK OFFICE
CERTIFICATE OF CORRECTION

PATENT NO. : 7,764,835 B2
APPLICATION NO. : 11/119782
DATED : July 27, 2010
INVENTOR(S) : Hiroyuki Takakura et al.

It is certified that error appears in the above-identified patent and that said Letters Patent is hereby corrected as shown below:

Column 13, Line 47 delete "value" and insert --value,--.

Signed and Sealed this

Twenty-first Day of December, 2010

David J. Kappos
*Director of the United States Patent and Trademark Office*